(12) United States Patent
Zarecki et al.

(10) Patent No.: US 12,530,707 B2
(45) Date of Patent: *Jan. 20, 2026

(54) CUSTOMER EFFORT EVALUATION IN A CONTACT CENTER SYSTEM

(71) Applicant: State Farm Mutual Automobile Insurance Company, Bloomington, IL (US)

(72) Inventors: Kimberly Zarecki, Bloomington, IL (US); Chris Johnson, Downs, IL (US); Marvin Roisland, El Paso, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 210 days.

This patent is subject to a terminal disclaimer.

(21) Appl. No.: 18/347,443

(22) Filed: Jul. 5, 2023

(65) Prior Publication Data

US 2023/0351455 A1 Nov. 2, 2023

Related U.S. Application Data

(63) Continuation of application No. 16/823,061, filed on Mar. 18, 2020, now Pat. No. 11,734,731.

(51) Int. Cl.
*G06F 9/451* (2018.01)
*G06F 3/04842* (2022.01)
*G06Q 30/02* (2023.01)

(52) U.S. Cl.
CPC ......... *G06Q 30/0281* (2013.01); *G06F 9/451* (2018.02)

(58) Field of Classification Search
CPC . G06Q 30/0281; G06Q 30/0282; G06F 9/451
See application file for complete search history.

(56) References Cited

U.S. PATENT DOCUMENTS 8,108,237 B2  1/2012  Bourne et al.
8,321,805 B2  11/2012  Tien et al.
(Continued)

FOREIGN PATENT DOCUMENTS

GB  2369263 A  5/2002

OTHER PUBLICATIONS

Convirza, "Call Reporting—Powerful insights at a glance with Convirza's advanced call reporting", retrieved on Oct. 18, 2019, available at <<https://www.convirza.com/call-reporting>>, 7 pages.
(Continued)

*Primary Examiner* — Tamara T Kyle
*Assistant Examiner* — William Wong
(74) *Attorney, Agent, or Firm* — Lee & Hayes, P.C.

(57) ABSTRACT

A contact center system can track and evaluate dialogue data, telephony data, and/or application usage data associated with communication sessions between customers and representatives. The contact center system can identify communication sessions that have dialogue data containing keywords of one or more keyword categories, such as keyword categories associated with perceptions of high customer effort, and/or based on values of other key performance indicators. Users can use the contact center system to investigate the dialogue data, telephony data, and/or application usage data for identified communication sessions, for example to identify opportunities to train representatives to use alternate language during communication sessions, revise procedures in the contact center, or otherwise reduce perceptions of customer effort.

20 Claims, 8 Drawing Sheets

(56) References Cited

U.S. PATENT DOCUMENTS

| | | | |
|---|---|---|---|
| 9,014,345 B2 | 4/2015 | Barnes et al. | |
| 9,165,556 B1 | 10/2015 | Sugar et al. | |
| 9,509,846 B1* | 11/2016 | Jandwani | H04M 3/42221 |
| 9,596,349 B1 | 3/2017 | Hernandez | |
| 9,942,115 B2 | 4/2018 | Rizzi et al. | |
| 2013/0132384 A1* | 5/2013 | Bohm | G06F 16/951 |
| | | | 707/736 |
| 2013/0136253 A1* | 5/2013 | Liberman Ben-Ami | |
| | | | H04M 3/5191 |
| | | | 379/265.09 |
| 2013/0173687 A1 | 7/2013 | Tuchman et al. | |
| 2014/0140497 A1* | 5/2014 | Ripa | H04M 3/5175 |
| | | | 379/265.06 |
| 2015/0170228 A1 | 6/2015 | Wheeler et al. | |
| 2016/0191710 A1 | 6/2016 | Dopiro | |
| 2016/0196561 A1 | 7/2016 | Iyer et al. | |
| 2016/0203121 A1* | 7/2016 | Okabe | G10L 25/63 |
| | | | 704/257 |
| 2016/0330145 A1 | 11/2016 | Patel et al. | |
| 2016/0373577 A1 | 12/2016 | Milstein | |
| 2017/0372323 A1 | 12/2017 | Stern et al. | |
| 2018/0077286 A1 | 3/2018 | Raanani et al. | |
| 2018/0123909 A1 | 5/2018 | Venkitapathi et al. | |
| 2019/0355043 A1 | 11/2019 | Swierk et al. | |
| 2021/0158366 A1 | 5/2021 | Arnold et al. | |
| 2021/0158813 A1 | 5/2021 | Sivasubramanian et al. | |

OTHER PUBLICATIONS

Office Action for U.S. Appl. No. 16/823,061, mailed on Nov. 29, 2021, Zarecki, "Customer Effort Evaluation in a Contact Center System", 21 Pages.

Office Action for U.S. Appl. No. 16/823,061, mailed on Jun. 10, 2022, Zarecki, "Customer Effort Evaluation in a Contact Center System", 24 pages.

Office Action for U.S. Appl. No. 16/823,061, mailed on Sep. 19, 2022, Zarecki, "Customer Effort Evaluation in a Contact Center System", 28 Pages.

Scheidt, et al., "Making a case for speech analytics to improve customer service quality: Vision, implementation, and evaluation", in the International Journal of Information Management, vol. 45, available at <<https://doi.org/10.1016/j.ijinfomgt.2018.01.002>>, Jan. 2018, 10 pages.

\* cited by examiner

CUSTOMER EFFORT EVALUATION IN A CONTACT CENTER SYSTEM

PRIORITY

This patent application is a continuation of, and claims priority, to U.S. patent application Ser. No. 16/823,061, filed on Mar. 18, 2020, entitled "CUSTOMER EFFORT EVALUATION IN A CONTACT CENTER SYSTEM," which is fully incorporated by reference herein.

TECHNICAL FIELD

The present disclosure relates to metrics associated with customer effort during customer interactions with contact centers, and more particularly to identifying interactions associated with high customer effort.

BACKGROUND

Companies often have call centers, or other contact centers, that are staffed with representatives who can communicate with customers. When a customer wants to make a change to a customer account with a company, has a problem with a product or service provided by the company, or has any other issue associated with the company, the customer can call a contact center to speak with a representative who may be able to assist the customer.

A customer may perceive his or her experience during communications with a contact center as involving various levels of effort. For example, if a customer is quickly connected to a contact center representative and the customer perceives the representative as being helpful in resolving the customer's issue, the customer may perceive that the interaction with the contact center involved relatively low effort on the customer's part. On the other hand, if, for example, the customer is put on hold for extended periods of time, the customer perceives a representative as being unhelpful, the customer's call is transferred between representatives, or the customer's issue is not resolved during a call such that the customer feels they need to call back, the customer may perceive that the interaction with the contact center involved relatively high effort on the customer's part.

SUMMARY

According to a first aspect, a method can include generating, by a contact center system, dialogue data associated with a plurality of communication sessions between one or more customers and one or more representatives. The method can also include identifying, by the contact center system based on customer feedback data, a first set of communication sessions that the customer feedback data indicates is associated with customer perceptions of high customer effort. The method can additionally include storing, by the contact center system, a keyword category that includes one or more keywords that occur within the dialogue data associated with the first set of communication sessions, the keyword category being associated with the customer perceptions of high customer effort. The method can further include identifying, by the contact center system, a second set of one or more communication sessions for which the dialogue data includes the one or more keywords of the keyword category, and displaying, by a user interface of the contact center system, user-selectable communication records associated with the second set of one or more communication sessions.

According to a further aspect, a contact center system can include one or more processors and memory. The memory can store computer-executable instructions that, when executed by the one or more processors, cause the contact center system to perform operations. The operations can include generating dialogue data associated with a plurality of communication sessions between one or more customers and one or more representatives. The operations can also include identifying, based on customer feedback data, a first set of communication sessions that the customer feedback data indicates is associated with customer perceptions of high customer effort. The operations can further include storing a keyword category in the memory that includes one or more keywords that occur within the dialogue data associated with the first set of communication sessions, the keyword category being associated with the customer perceptions of high customer effort. The operations can additionally include identifying a second set of one or more communication sessions for which the dialogue data includes the one or more keywords of the keyword category, and displaying, in a user interface, user-selectable communication records associated with the second set of one or more communication sessions.

According to another aspect, a method can include connecting, by a contact center system, a plurality of communication sessions between one or more customers and one or more representatives, and storing, by the contact center system, dialogue data representing the plurality of communication sessions. The method can also include determining, by the contact center system, when the dialogue data includes one or more keywords of one or more keyword categories associated with customer effort perceptions, and displaying, by the contact center system, user-selectable communication records associated with one or more communication sessions for which the dialogue data includes the one or more keywords of the one or more keyword categories.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
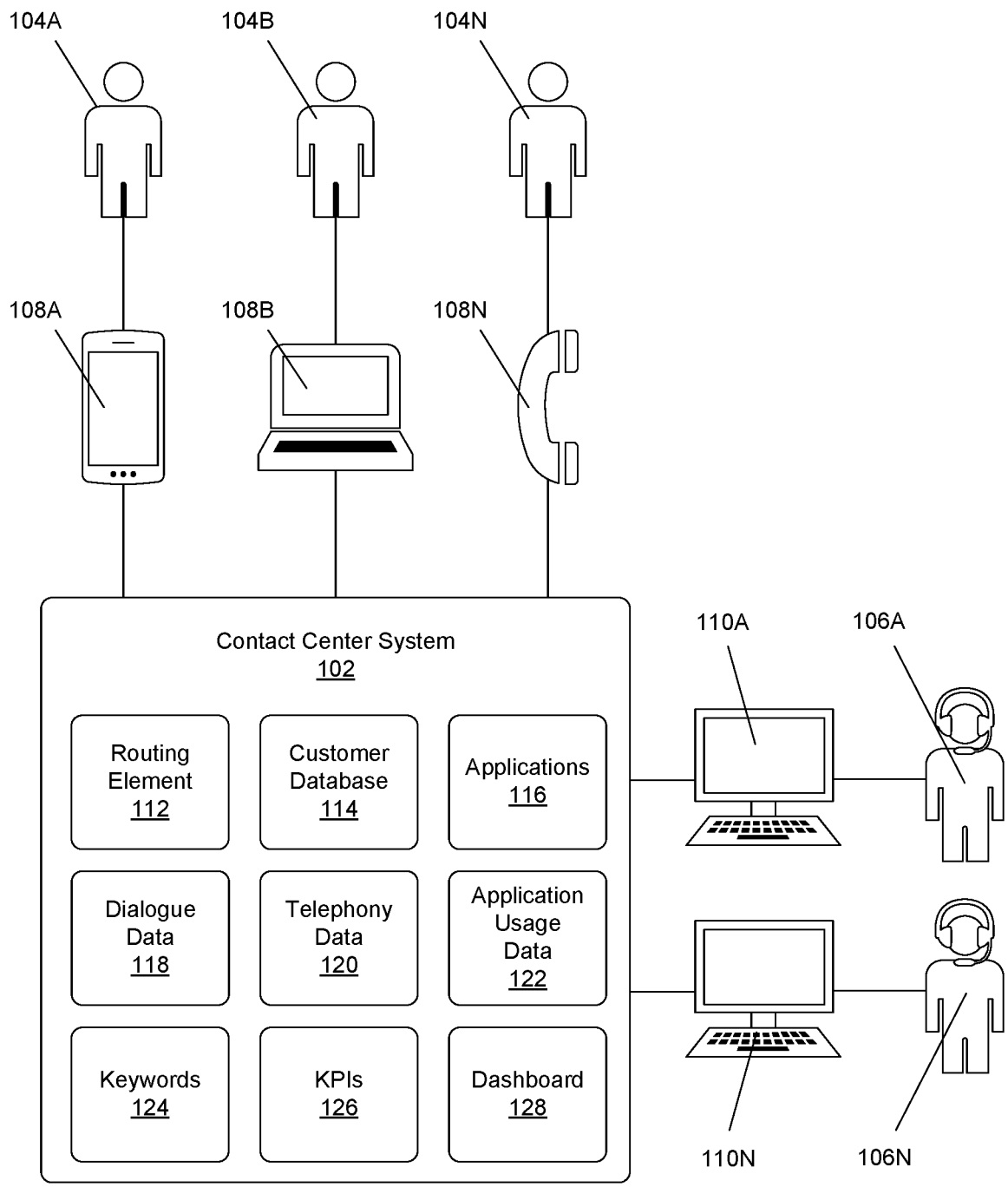
FIG. 1 shows an example of a contact center system.

A customer's perception of how much effort the customer expends while interacting with a company can often be correlated with the customer's satisfaction with the company and/or the customer's loyalty to the company. Customer effort metrics can therefore be useful predictors of customer loyalty, for example in situations in which customers use, or subscribe to, a company's products or services on an ongoing basis. Relatively low customer effort metrics can indicate that a customer believes that interactions with the company are relatively easy, and thus indicate that the customer is satisfied with the company and/or may be likely to continue using the company's products or services going forward. However, relatively high customer effort metrics can indicate that a customer believes that interactions with the company are relatively difficult, and thus indicate that the customer is dissatisfied with the company and/or may be likely to cancel services with the company or stop using the company's products in the future.

As an example, low customer effort may be associated with a situation in which a customer calls a company's customer support phone number and a contact center representative quickly resolves an issue for the customer. In this situation, the customer may feel that the issue was resolved without much effort on the customer's part, and the customer may be reasonably happy with the interaction. Accordingly, the interaction itself may not motivate the customer to consider ending use of the company's products or services.

On the other hand, high customer effort situations can occur if, for example, a customer is left on hold for long periods of time, a customer is transferred between multiple contact center representatives and/or must explain an issue to each new contact center representative the customer speaks to, a customer must call back multiple times to resolve an issue, a contact center representative uses language that frustrates a customer or seems unhelpful to the customer, or other situations occur that cause a customer to feel that interactions with the company are more difficult than the customer expects or would prefer. In such high customer effort situations, a customer may feel that, even if the customer's issue was ultimately resolved, the interaction with the company involved more effort on the customer's part than the customer would have liked. The customer's unhappiness with such a difficult interaction may cause the customer to become, or continue to be, dissatisfied with the company. In some cases, a high customer effort interaction with a company may itself be a catalyst that causes a customer to consider ending use of the company's products or services.

In some examples, high customer effort can be associated with procedural or systemic issues that may be out of the control of individual contact center representatives. For example, if contact center systems do not provide a particular contact center representative with tools or permissions to fix a customer's problem, that contact center representative may transfer a customer to another representative in a different department who has the right tools or permissions to resolve the problem. As another example, if a contact center does not staff enough representatives to handle a volume of customer calls, customers may be left on hold for longer than the customers would prefer. Although these types of issues may be frustrating for the customer and lead to a perception of high customer effort, the high customer effort may be due to procedural or systemic issues associated with the contact center.

In other examples, high customer effort can be associated with behavior of particular contact center representatives. For instance, if a contact center representative uses negative language or otherwise behaves in a manner that a customer finds frustrating or unhelpful during an interaction with a contact center, the customer may have a negative reaction to the interaction and perceive that a high amount of effort was required on the customer's part during the interaction.

High customer effort interactions can be associated with, and/or lead to, inefficient usages of resources within contact centers. For example, when a customer calls a contact center but perceives a contact center representative as being unhelpful or unable to resolve the customer's issue, the customer may call back to try to speak to a different representative or to inquire about the status of an on-going issue. This can lead to multiple calls about the same customer issue, and increase the volume of calls handled by the contact center overall. An increased call volume can lead to higher staffing requirements and/or increased hardware and computing resources that need to be provided for the increased amount of staff.

As will be described in greater detail below, the systems and methods described herein can identify such high customer effort interactions with a contact center. The systems and methods described herein can also provide data through which issues that led to perceptions of high customer effort can be investigated and corrected through employee coaching, process improvements, operational efficiencies, and/or other actions.

For example, identification of high customer effort interactions can help identify procedural or systemic issues with contact center systems that can be corrected or improved. For example, investigations of high customer effort interactions can show that processes or policies in a contact center are leading to high numbers of transfers, long hold times, or other issues. Such issues may be associated with high customer effort and/or an inefficient utilization of resources within the contact center. The contact center policies and processes can accordingly be revised to decrease the chances of such issues occurring, and thereby lower customer effort perceptions and/or make more efficient usage of contact center resources.

As another example, identification of high customer effort interactions can help evaluate performances of contact center representatives. For example, recordings or transcripts of identified high customer effort interactions can be used to find opportunities to train contact center representatives to handle customer service calls in ways that customers perceive as requiring less customer effort. Overall, this can lead to fewer callbacks and an overall lower call volume, and thereby also decrease the amount of computing resources used by representatives and other users in the contact center.

Additionally, although recordings of customer service calls are reviewed in some existing systems to evaluate performances of individual contact center representatives or to identify opportunities to train contact center representatives, in many existing systems managers only review a small percentage of call recordings, such as a random selection of 3% to 5% of the total number of all contact center calls. However, the systems and methods described herein can allow 100% or any other percentage of calls handled by a contact center to be automatically reviewed to identify interactions that may be associated with perceptions of high customer effort, and that should be reviewed further. Accordingly, instead of manually reviewing a random sample of communication sessions, communication sessions that are more likely to be associated with perceptions of high customer effort can be automatically identified and/or flagged for further review.

FIG. 1 shows an example of a contact center system 102. The contact center system 102 can connect calls and/or other communications between customers 104 and representatives

106. For example, the contact center system 102 can receive calls or other communications from communication devices 108 operated by customers 104, and connect the calls or other communications to communication devices 108 and/or terminals 110 operated by representatives 106. The contact center system 102 can execute on one or more computing devices. An example architecture for a computing device that can execute one or more elements of the contact center system 102 is shown and described below with respect to FIG. 8.

The contact center system 102 can be used in a contact center at which one or more representatives 106 handle calls and/or other communications from customers 104. In some examples, the contact center can be a customer support call center, technical support call center, or any other type of contact center staffed with multiple representatives 106. In other examples, the contact center can be a smaller environment, such as an office with a receptionist acting as a representative 106.

In some examples, a customer 104 can be an external customer of a company associated with the contact center system 102, such as a user who consumes products and/or services from the company associated with the contact center system 102. In other examples, a customer 104 can be an internal customer of the company associated with the contact center system 102. For instance, an employee or a third-party who is contracted with a company may be considered to be an internal customer 104 who can call an internal support line to reach the contact center system 102 and ask a representative 106 for assistance with internal issues related to the company. In still other examples, a customer 104 can be any other type of customer, user, or entity.

In some examples, a communication device 108 associated with a customer 104 or a representative 106 can be a telephone, such as a smartphone, another type of mobile phone, or a landline phone. In other examples, a communication device 108 can be any other type of device that can engage in calls or other types of communications, including a personal digital assistant (PDA), a personal computer (PC) such as a laptop, desktop, or workstation, a media player, a tablet computer, a gaming device, a smart watch, or any other type of computing or communication device.

A terminal 110 can be a computing device, such as laptop, desktop, workstation, tablet, or any other computing device. In some examples, a terminal 110 can be a part of the contact center system 102. In other examples, a terminal 110 can be a separate computing device through which a representative 106 can interface with the contact center system 102. In some examples, a representative 106 may engage in a call or other communication directly through a terminal 110, such as by engaging in a chat session through the terminal 110 or engaging in a Voice Over IP (VoIP) call or other type of digital audio communication through the terminal 110. However, in other examples, a representative 106 may engage in a call or other communication through a telephone, telephone headset, or other communication device 108, but also have a terminal 110 that the representative 106 can use to assist customers 104.

In some examples, the communications processed by the contact center system 102 can be calls, such as voice calls or video calls. For example, the contact center system 102 can connect telephone calls between customers 104 and representatives 106 via communication devices 108 and/or terminals 110. The communications processed by the contact center system 102 can also, or alternately, include other types of communications such as chat sessions, instant messages, text messages, email messages, or other types of real-time or non-real-time communications. For example, the contact center system 102 can manage chat sessions and/or route other types of text-based messages between communication devices 108 operated by customers 104 and terminals 110 operated by representatives 106.

The contact center system 102 can have a routing element 112 that connects calls, transfers calls, and/or otherwise routes calls or other communications between customers 104 and representatives 106. For example, when a customer 104 places a call to the contact center, the routing element 112 can select an available representative 106 and route the call to the selected representative 106, or place the call into a queue until a representative 106 becomes available. The routing element 112 can also transfer calls between representatives 106, for instance if a representative 106 handling a call determines that another representative 106 has more experience with a type of customer issue associated with the call and inputs a command to transfer the call to the other representative 106.

A terminal 110 can allow a representative 106 to access and use a customer database 114 and/or computer-executable applications 116. In some examples, the customer database 114 and/or applications 116 can be stored and/or executed on the contact center system 102. In other examples, a customer database 114 and/or applications 116 can be stored and/or executed locally on separate terminals 110. In still other examples, a customer database 114 and/or applications 116 can be stored and/or executed on other computing devices, such as on a network server or cloud-based server.

A representative 106 may accordingly use one or more applications 116 via a terminal 110 before, during, or after a communication session with a customer 104 to look up customer account information stored in a customer database 114, make changes to the customer account information, and/or access or edit any other type of information. As an example, if a customer 104 calls about an issue with a product or service, a representative 106 may be able to use one or more applications 116 to look up information about the product or service, look up information about the customer 104, look up information about the type of issue the customer 104 is experiencing, and/or take steps to attempt to resolve the issue for the customer 104.

The contact center system 102 can generate and/or store data about communication sessions that occur between customers 104 and representatives 106. For example, the contact center system 102 can generate and/or store dialogue data 118, telephony data 120, and/or application usage data 122 associated with communication sessions.

Dialogue data 118 can include audio recordings of calls between customers 104 and representatives 106, text transcripts of calls between customers 104 and representatives 106, copies of text-based messages that have been exchanged between customers 104 and representatives 106, and/or other representations of communications between customers 104 and representatives 106. In some examples, the contact center system 102 may record audio of a call between a customer 104 and a representative 106, use speech recognition systems to generate a corresponding text transcript from the audio recording of the call, and store the audio recording and/or the text transcript as dialogue data 118. In other examples, the contact center system 102 may use speech recognition systems to generate a text transcript substantially in real-time as a call is occurring between a customer 104 and a representative 106, and store the text transcript and/or a corresponding audio recording as dialogue data 118.

The telephony data 120 can include statistics and other metrics about calls between customers 104 and representatives 106. For example, telephony data 120 can indicate when a customer 104 placed a call, when and/or how long the customer 104 was on hold before the call was answered, when and/or how long the customer 104 was on hold after the call was answered, how many times a representative 106 put the customer 104 on hold, and/or other types of call data. In some examples, the telephony data 120, or other data stored by the contact center system 102, can express similar statistics and data about other types of communications, such as how long a customer 104 waited before a chat session with a representative 106 began, or whether a customer 104 was transferred to another representative 106 during a chat session.

The application usage data 122 can include statistics and other data about applications 116 that representatives 106 have used via terminals 110. As discussed above, a representative 106 may use a terminal 110 to access and use applications 116 before, during, or after communications with customers 104. In some examples, a representative 106 may use such applications 116 during a communication session with a customer 104 to assist the customer, and/or use such applications 116 after a communication session with a customer 104 to follow up on an ongoing issue or to try to resolve an issue for a customer 104 after a communication session ends. The application usage data 122 can accordingly indicate when a representative 106 was using applications 116, identify which applications 116 the representative 106 was using, indicate when a terminal 110 of the representative 106 was idle, and/or indicate other statistics and information about usage of applications 116 via terminals 110.

The contact center system 102 can also include data about keywords 124. Keywords 124 can include words and/or phrases that have been identified as being associated with customer perceptions of customer effort. As an example, a customer may perceive interactions with a representative 106 as being associated with high customer effort when the representative 106 tells the customer 104 that the representative 106 cannot help with the customer's issue, cannot find relevant information in the customer database 114, or otherwise cannot do something that the customer 104 expects that the representative 106 should be able to do. Accordingly, words and phrases such as "can't," "cannot," "unable," "not able," or "did not" that may be likely to occur during such high customer effort interactions can be identified and stored as keywords 124. An example process for identifying keywords 124 based on sample dialogue data 118 using the contact center system 102 is described in more detail below with respect to FIG. 6.

The contact center system 102 can be configured to determine if, when, and/or how frequently dialogue data 118 representing interactions between customers 104 and representatives 106 contain keywords 124. As an example, if dialogue data 118 associated with a particular representative 106 contains keywords 124 associated with high customer effort more frequently than dialogue data 118 associated with other representatives 106, the higher frequency of high customer effort keywords 124 used by the particular representative 106 can indicate an opportunity to train the particular representative 106 to use different language during interactions with customers 104. As another example, if the contact center system 102 identifies that dialogue data 118 associated with a representative 106 frequently contains keywords 124 associated with low customer effort, the frequency of low customer effort keywords 124 used by the representative 106 can indicate an opportunity to reward that representative 106.

Figure 2:
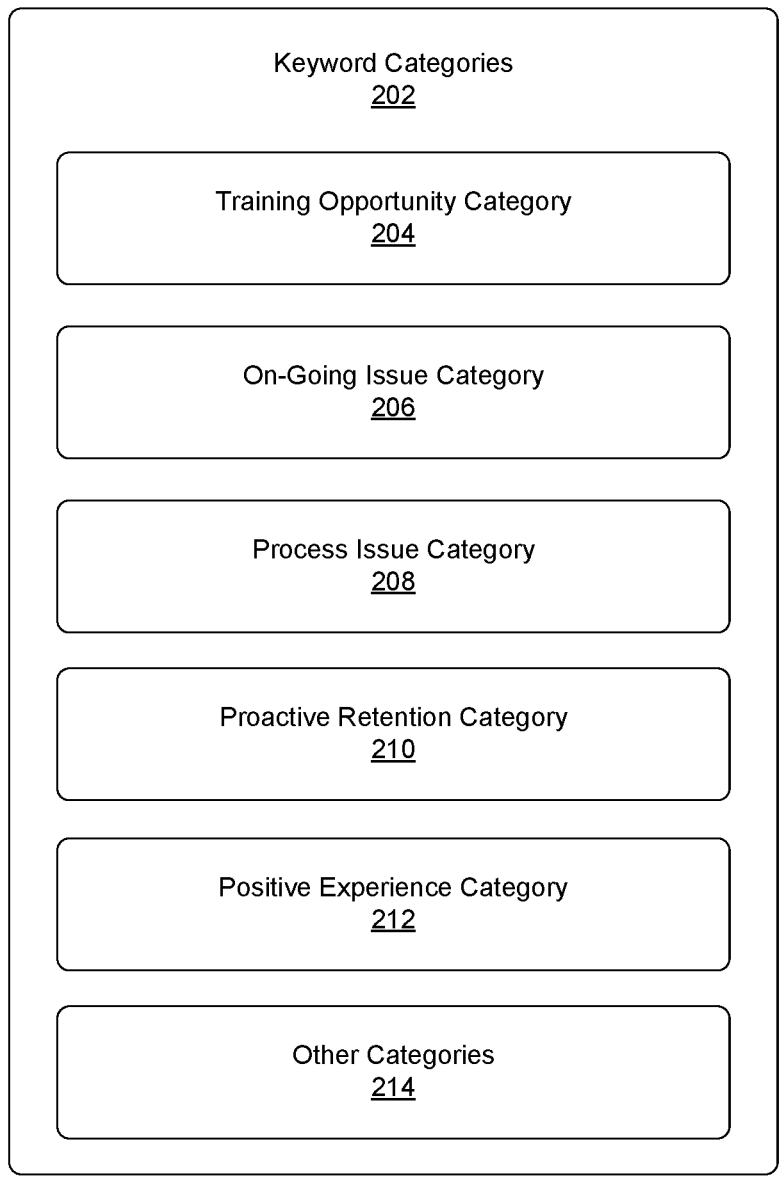
FIG. 2 shows example keyword categories that can be stored by a contact center system.

As shown in FIG. 2, in some examples the keywords 124 stored by the contact center system 102 can include keywords 124 within different keyword categories 202. Individual keyword categories 202 may be associated with different reasons for perceptions of high or low customer effort. For example, keyword categories 202 can include a training opportunity category 204, an on-going issue category 206, a process issue category 208, a proactive retention category 210, a positive experience category 212, and/or other categories 214 of keywords 124.

The training opportunity category 204 can include keywords 124 that, when used by representatives 106, may be associated with perceptions of high customer effort. In some examples, this keyword category 202 can include keywords 124 such as "can't," "unable," or other words that can be frustrating for customers 104 when used by representatives 106. Usage of keywords 124 in the training opportunity category 204 can indicate opportunities to train representatives 106 to use alternate language that customers 104 may perceive as being more helpful and/or being associated with lower customer effort.

As an example, if the contact center system 102 is associated with an automobile insurance company, customers 104 may call representatives 106 to ask about their insurance policies, check on the status of insurance claims that have been filed, inquire about the status of a vehicle repair, or call about any other insurance-related issue. In this example, the training opportunity category 204 can include keywords 124 that may lead to perceptions of high customer effort when a representative is unable to locate a customer's insurance policy information, is unable to locate an insured party's information, does not provide estimates of expected or normal timeframes for vehicle repair or a claim stage, is not able to complete a customer's request, negatively frames information above a customer's insurance coverage or deductible information, or negatively frames how a filed claim may impact the customer's insurance rate or premiums. Such keywords 124 can indicate perceptions of high customer effort, and indicate opportunities where representatives 106 can be trained to use other language that customers 104 may perceive as involving lower customer effort. For instance, instead of saying "I don't know how long the body shop will take to fix your car," a representative 106 can be trained to say, "The body shop normally takes three days to fix this type of damage," if information available through a terminal 110 indicates that three days is a normal timeframe. Providing a normal or average timeframe to a customer 104 can be perceived as lowering customer effort because it provides the customer 104 with guidance, whereas providing no timeframe to a customer 104 can be perceived as increasing customer effort because the customer 104 is given no guidance or expectation.

The on-going issue category 206 can include keywords 124 that may indicate that a customer 104 is, or has been, experiencing an on-going issue that has not yet been resolved. For example, the on-going issue category 206 can include keywords 124 such as "I've already called about this," "last time," "I was told," or other language that may indicate a history with a repeating or ongoing customer issue. Usage of phrases that include keywords 124 in the on-going issue category 206 can indicate opportunities to improve systems and policies to resolve issues for customers 104 so that the customers 104 are less likely to call back about the same issue.

The process issue category 208 can include keywords 124 that may indicate that a customer 104 is experiencing, or has experienced, a procedural or systemic issue with the contact center system 102, such as long hold times or contact center procedures or policies that have led to multiple transfers between representatives. For example, this keyword category 202 can include keywords 124 in phrases such as "finally," "was on hold for a long time," or "I already explained this to the last person." Usage of phrases that include keywords 124 in the process issue category 208 can indicate opportunities to improve procedures and policies to reduce hold times, reduce the number of transfers, or otherwise resolve process issues within the contact center.

The proactive retention category 210 can include keywords 124 that indicate a customer 104 is, or may be, considering ceasing use of a company's products or services. For example, this keyword category 202 can include keywords 124 in phrases such as "this is third month in a row my bill has gone up, or other keywords 124 such as "cancel," "frustrated," or "switch." Usage of phrases that include keywords 124 in the proactive retention category 210 can indicate opportunities to reach out to customers 104 to resolve issues before the customers 104 cancel using the company's products or services.

The positive experience category 212 can include keywords 124 that may be associated with perceptions of low customer effort. For example, a low customer effort category of keywords 124 may include words in phrases such as "thank you very much" or "you have been very helpful," because utterances by customers 104 of phrases including such keywords 124 can indicate that the customers 104 had a positive experience and may have perceived that the interactions took low customer effort. In some examples, the positive experience category 212 can include words and phrases that include adjectives, adverbs, or other modifying language in addition to words of gratitude or other positive words. For instance, the positive experience category 212 may encompass phrases such as "thank you very, very much" but not necessarily encompass "thank you" alone, in order to help identify responses that may be more positive than routine formalities. Usage of phrases including keywords 124 in the positive experience category 212 can indicate opportunities to recognize or reward representatives 106 for providing good customer service and helping to reduce perceptions of customer effort.

In some examples, keyword categories 202 can include sets of individual keywords 124 and define rules for identifying phrases that include those individual keywords 124. For example, a keyword category 202 can include keywords 124 such as "can't" and "find," and define a rule indicating that dialogue data 118 matches the keyword category 202 if certain keywords 124 appear within a threshold distance, such as within five words, of each other within dialogue data 118. Accordingly, in this example, the rule may cause dialogue data 118 that includes the phrase "I can't seem to find your information" to be flagged as matching a rule defined by the keyword category 202, because "can't" appears within five words of the word "find" in the dialogue data 118. However, if instead dialogue data 118 contains instances of the words "can't" or "find" that are not within the threshold distance of each other, such instances may not match this example rule and might not be flagged as being associated with customer perceptions of high customer effort.

Returning to FIG. 1, the contact center system 102 can generate and store key performance indicators (KPIs) 126 about communication sessions between customers 104 and representatives 106. The contact center system 102 can be configured to derive one or more KPIs 126 based on one or more of the dialogue data 118, the telephony data 120, the application usage data 122, and/or other data available to the contact center system 102. As will be described below, the KPIs 126 can be used to evaluate past communication sessions, identify opportunities to train representatives 106, and/or identify opportunities to make process improvements or implement other operational efficiencies in a contact center.

The KPIs 126 can be customer effort metrics that measure or estimate customers' perceptions of customer effort associated with communication sessions with the contact center. For example, some KPIs 126 generated from telephony data 120 can be based on hold times, and indicate that customers who were on hold for shorter periods of time likely perceived lower customer effort than other customers who were put on hold for longer periods of time during their calls. As another example, the contact center system 102 can generate KPIs 126 based on how frequently keywords 124, such keywords 124 in one or more keyword categories 202, appear in dialogue data 118 associated with communication sessions.

The contact center system 102 can automatically generate one or more KPIs 126 associated with any or all of the communication sessions handled by the contact center system 102. For example, the same type of KPI 126 can be generated for each of a set of communication sessions, such that corresponding KPIs 126 can be compared across the set of communication sessions and outliers in the KPIs 126 can be identified. For instance, based on identifying that a particular communication session is associated with an outlier KPI 126 relative to other communication sessions, a contact center manager or other user can access dialogue data 118 to listen to an audio recording or read a text transcript of the particular communication session, and investigate reasons for the outlier KPI 126. Accordingly, rather than a contact center manager evaluating dialogue data 118 for a random selection of communication sessions that may or may not be associated with high or low customer effort, the contact center system 102 can identify or flag specific communication sessions that KPIs 126 indicate are likely to be associated with high or low customer effort.

The contact center system 102 can also have a dashboard 128. The dashboard 128 can include a user interface that can display scorecards, trends, statistics, records, and/or other information about or derived from communication sessions. For example, the dashboard 128 can display data associated with KPIs 126 for a set of communication sessions associated with a particular representative 106, data associated with KPIs 126 for communication sessions associated with a set of representatives 106, data associated with KPIs 126 for communication sessions associated with a particular customer 104, trends of KPIs 126 over time, or any other type of KPI 126 or scorecard data. The user interface of the dashboard 128 can also be configured to allow users to access dialogue data 118, telephony data 120, and/or application usage data 122 directly. For example, the dashboard 128 can allow users to select a particular communication session, and listen to an audio recording or read a text transcript of that particular communication session. The dashboard 128 can also be configured to display and other information about the contact center system 102. A user, such as a contact center manager, can use a terminal 110 or other computing device to access the dashboard 128. Examples of information that can be displayed in the dashboard 128 are described further below with respect to FIGS. 4A, 4B, and 5.

Figure 3:
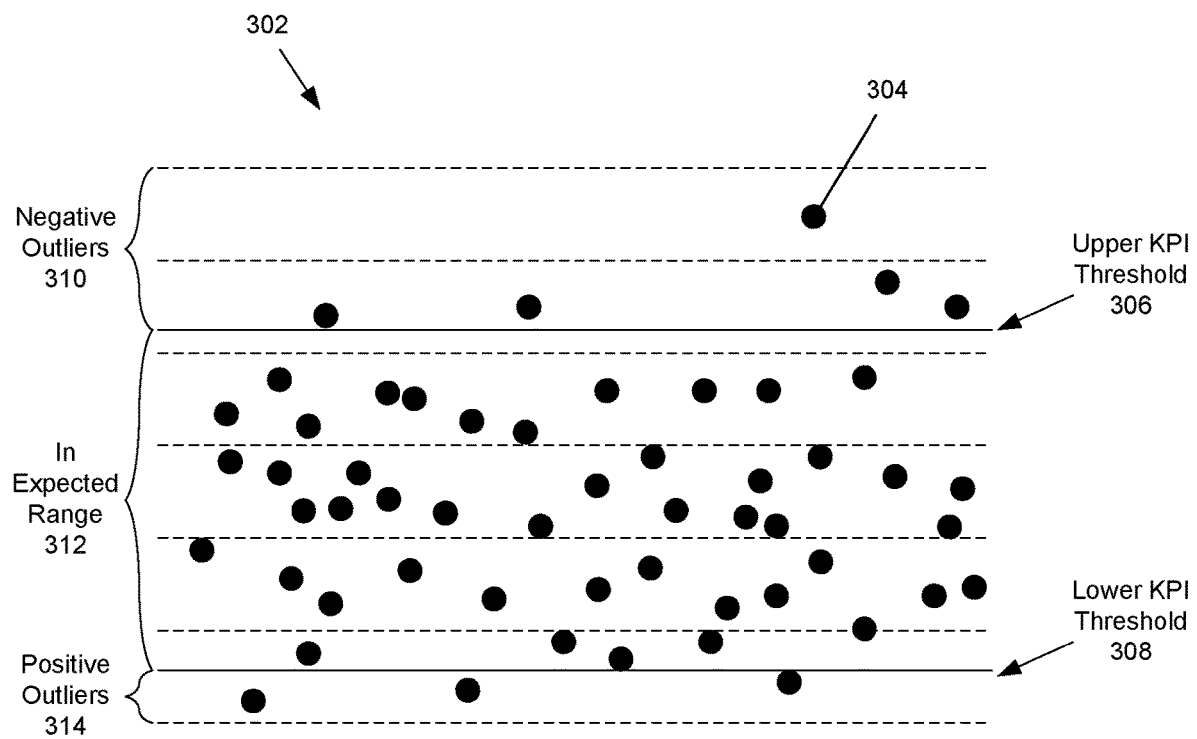
FIG. 3 shows an example of a key performance indicator (KPI) graph.

FIG. 3 shows an example of a KPI graph 302. The KPI graph 302 can include dots or other representations of a set of communication records 304 associated with communication sessions. The communication records 304 on the KPI graph 302 can be arranged based on corresponding values of KPIs 126 of the communication records 304. For example, a KPI graph 302 may arrange representations of communication records 304 relative to corresponding values of KPIs 126 for time spent on hold, number of transfers, total call duration, frequency of keywords 124 used, or other KPIs 126 as discussed above.

In some examples, a KPI graph 302 can be displayed in the dashboard 128 or in another user interface such that a user can click on, or otherwise select, a communication record 304 on the KPI graph 302 to access dialogue data 118, telephony data 120, application usage data 122, and/or other data about a corresponding communication session. In some examples, a KPI graph 302 and/or its underlying data can alternately, or additionally, be used by the contact center system 102 internally to determine relative differences of KPIs 126 of different communication records 304, determine trends of KPIs 126 over time, determine outliers in the KPIs 126 of communication records 304, and/or in any other way.

For example, the contact center system 102 can use data associated with a KPI graph 302 to arrange or compare KPIs 126 of communication records 304 against an upper KPI threshold 306 and/or a lower KPI threshold 308. In various examples, an upper KPI threshold 306 and/or lower KPI threshold 308 can be determined based on statistical averages of KPIs 126, standard deviations from average values of KPIs 126, surveys of customers 104, goals determined by contact center managers or other users, and/or based on any other factor. For example, surveys of customers 104 can be used to determine time periods that customers 104 feel are acceptable time periods to be on hold during calls, and an upper KPI threshold 306 for a hold time KPI 126 can be set based on the survey data.

Communication records 304 with KPI 126 values above the upper KPI threshold 306 can be negative outliers 310, communication records 304 with KPI 126 values between the upper KPI threshold 306 and the lower KPI threshold 308 can in an expected range 312, and communication records 304 with KPI 126 values below the lower KPI threshold 308 can be positive outliers 314. In some examples, the dashboard 128 or another user interface can flag when communication records 304 have KPIs 126 that are outliers that fall above or below threshold values, and can allow users to access corresponding dialogue data 118, telephony data 120, application usage data 122, and/or other data.

As an example, if a KPI graph 302 arranges communication records 304 based on corresponding values for a KPI 126 associated with a percentage of time that representatives 106 kept customers 104 on hold during calls, the contact center system 102 can identify communication records 304 with KPI 126 values above the upper KPI threshold 306 as negative outliers 310 that indicate that callers were kept on hold for a longer than a threshold period of time. In this example, a contact center manager or other user may use a dashboard 128 or other user interface to select a communication record 304 that is a negative outlier 310, and access corresponding dialogue data 118, telephony data 120, application usage data 122, and/or other data to investigate why a caller was kept on hold for longer than the threshold period of time. For instance, a contact center manager may review application usage data 122 associated with communication record 304 that is a negative outlier 310 and determine that a representative 106 was using applications 116 for unrelated or personal use while a caller was on hold, thus leading to the long hold time. This determination may identify an opportunity to train the representative 106 to avoid using applications 116 for unrelated reasons while callers are on hold. However, for another communication record 304 that is a negative outlier 310, the contact center manager may use corresponding dialogue data 118 and/or application usage data 122 to determine that a caller was calling about a particularly difficult issue, and thus that keeping the customer 104 on hold for longer than the threshold period of time was appropriate in this situation while the representative 106 investigated the issue.

As another example, a KPI graph 302 may arrange communication records 304 arranged based on values for a KPI 126 linked to with frequencies of keywords 124 associated with words or phrases used by representatives 106 that lead to perceptions of high customer effort. In this example, negative outliers 310 can represent communication sessions in which representatives 106 used keywords 124 more frequently than a threshold frequency. Accordingly, a contact center manager or other user may use a dashboard 128 or other user interface to select a communication record 304 that is a negative outlier 310, and review corresponding dialogue data 118 to investigate why such keywords 124 were used by a representative 106 during communications with a customer 104. The contact center manager may, for instance, listen to a corresponding audio recording to determine if a representative's usage of keywords 124 was appropriate in the situation or indicates an opportunity to train the representative 106 to use different language during interactions with customers 104. For example, if a representative 106 frequently uses phrases that include keywords 124 associated with perceptions of high customer effort, such as "I can't tell you when your problem will be fixed," there may be an opportunity to train the representative 106 to use alternate phrases that may be perceived as involving lower customer effort, such as "normally our team fixes your type of problem within two days."

In some examples, a KPI graph 302 may be based on communication records 304 associated with a single representative 106. However, in other examples, a KPI graph 302 may be based on communication records 304 associated with a set of representatives 106, such as a team of representatives 106 that are managed by the same contact center manager. A contact center manager, or other user, can accordingly compare relative performances of a set of representatives 106 based on one or more KPIs 126.

Figure 4A:
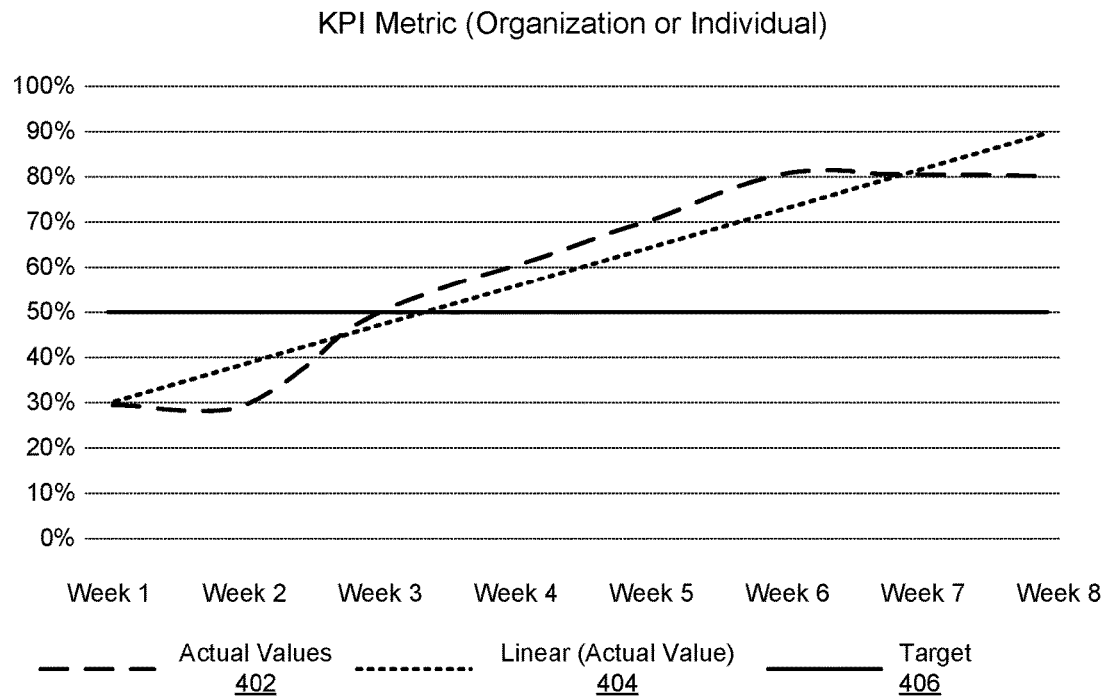
FIGS. 4A and 4B show examples of KPI trends and/or KPI statistics that can be displayed in a dashboard of a contact center system.
Figure 4B:
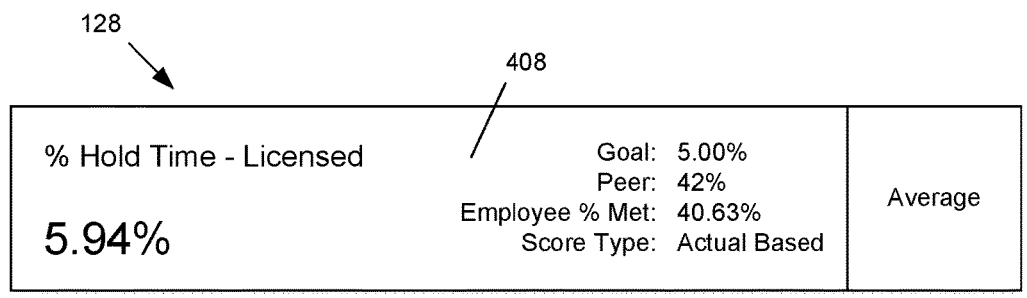
Figure 4B:
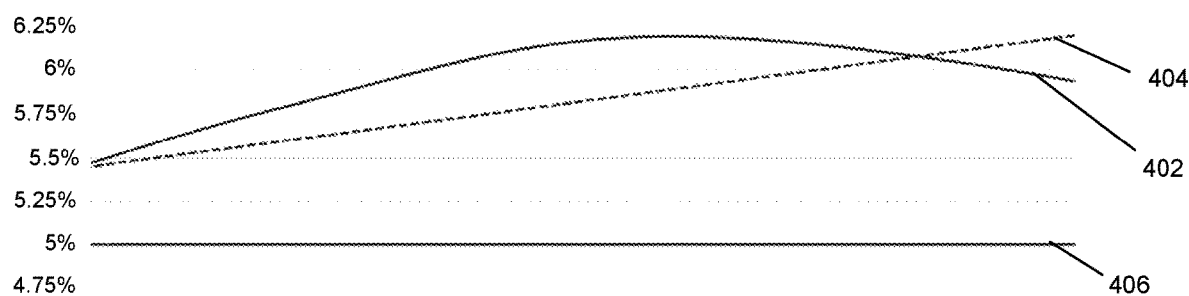

FIGS. 4A and 4B show examples of KPI trends and/or KPI statistics that can be displayed in a dashboard 128 of the contact center system 102. As discussed above, the contact center system 102 can determine KPIs 126 for communication records 304 associated with individual representatives 106, or teams or other groups of representatives 106. In some examples, the contact center system 102 can use the KPIs 126 to determine KPI statistics or metrics, such as percentages of time representatives 106 kept customers 104 on hold, transfer statistics indicating how many times or how frequently customers 104 were transferred, durations of communication sessions, frequency of keywords 124 used in one or more keyword categories 202, a percentage of time application usage data 122 shows that applications were idle or were in use on terminals 110 of representatives 106, a percentage of repeat callers, and/or other statistics or metrics derived from the KPIs 126 discussed above.

As shown in the example of FIG. 4A, the dashboard 128 can display a KPI trend chart based on KPI data for one or more representatives 106. For example, the dashboard 128 can display a KPI trend chart that depicts actual values 402 of a KPI 126 metric across a set of communication records 304 during a period of time. The KPI trend chart may also depict a linear KPI trendline 404 derived from the actual values 402 of the KPI 126, such as linear line derived by averaging or otherwise smoothing the actual values 402, and/or other lines or visualizations of actual or derived KPI data. The chart can also display a target line 406 indicating a goal or upper KPI threshold 306, so that a user can compare the actual values 402 and/or KPI trendline 404 against the target line 406.

FIG. 4B depicts an example user interface for a dashboard 128 that displays KPI trends and KPI statistics related to call hold times associated with a representative 106. The example dashboard 128 shown in FIG. 4A can include a KPI trend chart, similar to the KPI trend chart shown in FIG. 4A, that includes a linear KPI trendline 404 showing a general increase in hold time percentages across a selected period of time. However, in the example of FIG. 4B, the KPI trend chart can also display actual values 402, and/or a smoothed version of actual values 402, showing that although hold times associated with the representative 106 were increasing at the beginning of the selected period of time, the hold times flattened out and were decreasing by the end of the selected period of time. The dashboard 128 can also be configured to show a target line 406 indicating a goal or upper KPI threshold 306, such as 5% hold times in the example of FIG. 4B, so that a user can compare the actual values 402 and KPI trendlines 404 against the target line 406. In some examples, the dashboard 128 can accept user input to select the period of time for which information is shown in the dashboard 128, a type of KPI 126 that the displayed actual values 402, trendlines 404, and/or target lines 406 represent, and/or other user input that can filter or change what KPI trend data is displayed on the dashboard 128.

Additionally, as shown in FIG. 4B, in some examples the contact center system 102 can also, or alternately, display KPI statistics 408 in the dashboard 128. For instance, in FIG. 4B, example KPI statistics 408 indicate that a selected representative 106 is keeping customers 104 on hold 5.94% of the time, which is above a goal or upper KPI threshold 306 of 5%. The KPI statistics 408 may also indicate how a representative's KPI statistics 408 relate to KPI statistics 408 of other peer representatives 106. Although the example KPI statistics 408 shown in FIG. 4B are for a single representative 106, the dashboard 128 can also be configured to display KPI statistics 408 about more than one representative 106, such as average KPI statistics 408 for a team of representatives 106 or comparisons of KPI statistics 408 for different representatives 106.

Figure 5:
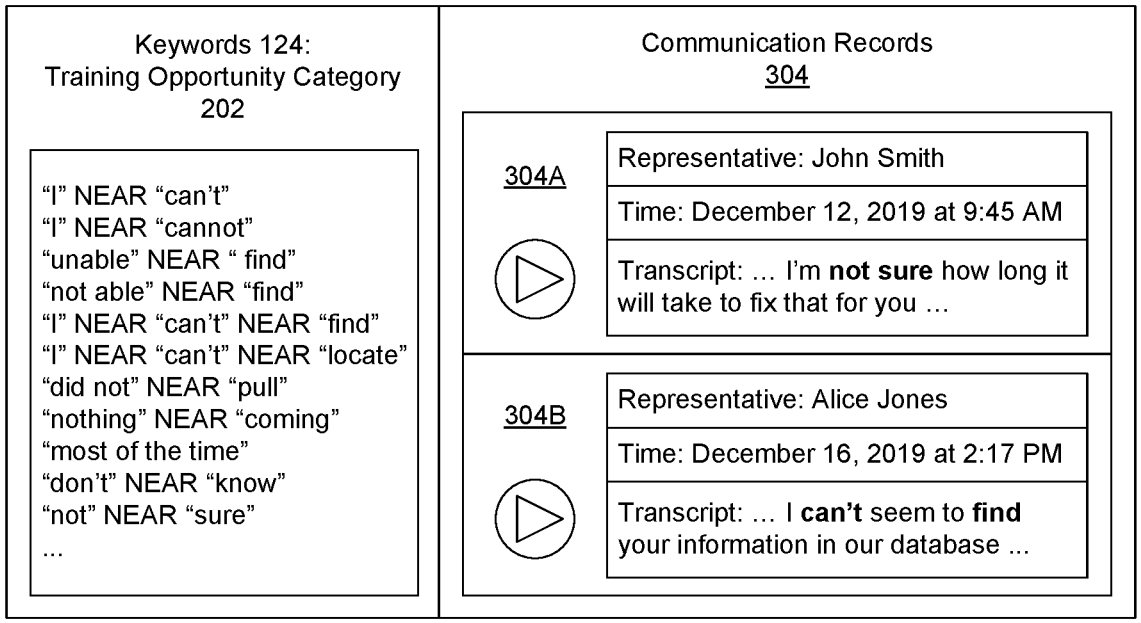
FIG. 5 shows an example in which a dashboard of a contact center system displays communication records associated with keyword categories.

FIG. 5 shows an example in which the dashboard 128 displays communication records 304 associated with keyword categories 202. In the example of FIG. 5, a user may select a keyword category 202, or one or more keywords 124, and be presented with a set of communication records 304 that have dialogue data 118 that match the selected keyword category 202 or keywords 124. As an example, when a selected keyword category 202 is a training opportunity category 204 that includes keywords 124 such a "can't" or "unable," the dashboard 128 can filter communication records 304 based on the selected keywords 124 and display communication records 304 with dialogue data 118 including "can't" or "unable." As shown in FIG. 5, in some examples the dashboard 128 can display communication records 304 with dialogue data 118 that match rules defined by a keyword category 202 for combinations of individual keywords 124, such as by surfacing communication records 304 that have keywords 124 that appear near each other within five words or any other threshold distance of each other within dialogue data 118. In some examples, a user can use the dashboard 128 to change between keyword categories 202 to view different communication records 304 that match different keyword categories 202.

Similar to an example discussed above with respect to FIG. 3, a contact center manager or other user may use the dashboard 128 to investigate why keywords 124 were used by representatives 106 during communication sessions associated with the matching communication records 304 shown in FIG. 5. For example, a user can access dialogue data 118 associated with a communication record 304 to review text transcripts and/or listen to audio recordings of corresponding communication sessions to determine if uses of the keywords 124 by representatives 106 were reasonable under the circumstances of the communication sessions, or if such uses indicate opportunities to train the representatives 106 to use different words and phrases that customers 104 may perceive as involving less customer effort.

Figure 6:
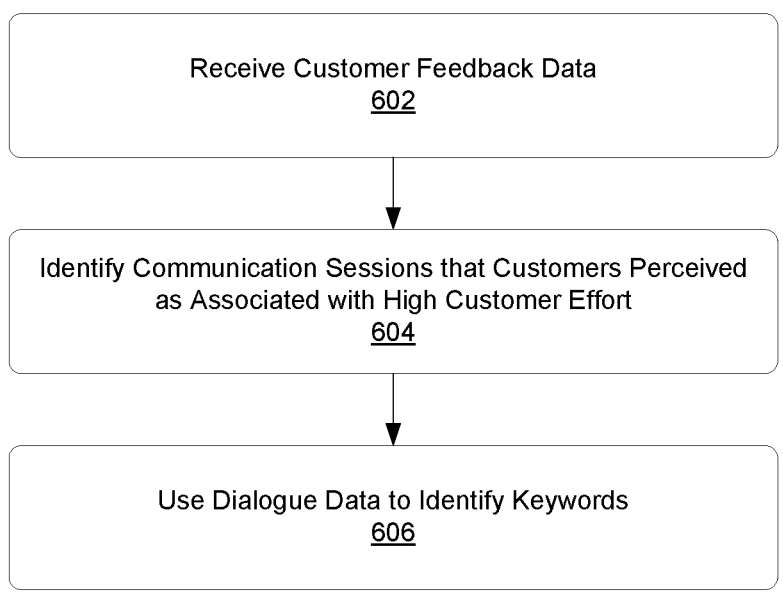
FIG. 6 shows a flowchart illustrating a method for determining keywords for a contact center system.

FIG. 6 shows a flowchart illustrating a method for determining keywords 124 for a contact center system 102. As discussed above, after such keywords 124 have been determined, the contact center system 102 can determine whether dialogue data 118 associated with subsequent communication sessions includes the keywords 124. The contact center system 102 can accordingly generate KPIs 126 based on keyword usage or keyword frequency, and/or flag or display communication records 304 that have dialogue data 118 that matches keywords 124 in a dashboard 128 or other user interface.

At block 602, the contact center system 102 can receive customer feedback data. The customer feedback data can be associated with already-completed communication sessions with a contact center. For example, the customer feedback data can be results of polls or surveys that customers 104 completed via the contact center system 102 when previous communication sessions terminated. As other examples, the customer feedback data can be results of other surveys or polls of customers, feedback obtained during interviews conducted with customers 104, customer feedback received by email or online forms, or any other type of customer feedback. In some examples, one or more processors of a contact center system 102 can receive the customer feedback data via a network connection or other data connection.

At block 604, the contact center system 102 can identify one or more specific completed communication sessions with representatives 106 that, based on customer feedback data, customers perceived to be associated with high customer effort. For example, the contact center system 102 can identify previous communication sessions that customers 104 rated with one out of five stars, or with lower than any other threshold rating, in customer feedback data, and the contact center system 102 can identify such communication sessions as high customer effort communication sessions.

At block 606, the contact center system 102 can use dialogue data 118 captured in association with the completed communication sessions identified at block 604 to identify keywords 124. In some examples, the contact center system 102 can use natural language processing, machine learning techniques, and/or other automated language processing to determine if any words and/or phrases are used more frequently in dialogue data 118 of the communication sessions identified at block 604 than in other communication sessions. As another example, if the dialogue data 118 includes words that correspond with words provided in the customer feedback data in fields associated with reasons why the completed communication sessions were perceived as being associated with high customer effort, those words and/or phrases can be used as keywords 124.

In some example, at block 606 the contact center system 102 can use natural language processing, machine learning techniques, and/or other automated language processing to automatically review dialogue data 118 associated with previous communication sessions to find words that were used more frequently within communication sessions that customer feedback data indicates were associated with perceptions of high customer effort than in other communication sessions that customer feedback has not shown to be associated with perceptions of high customer effort. For instance, the contact center system 102 may review audio recordings and/or text transcripts and find patterns indicating that words and/or synonyms such as "can't," "cannot," "unable," "not able," and "did not" were used more frequently in high customer effort communication sessions than other communication sessions.

In some examples, the contact center system 102 can designate such automatically identified words or phrases as keywords 124 at block 606. In other examples, the contact center system 102 can designate such automatically identified words or phrases as candidate keywords 124 at block 606, and a human reviewer can use the dashboard 128 or other user interface evaluate the automatically-determined candidate keywords 124 and approve or reject them as keywords 124.

In some examples, the contact center system 102 can include machine learning and/or artificial intelligence systems that can evaluate dialogue data 118 based on customer feedback data to identify a set of keywords 124. For example, the contact center system 102 can use supervised machine learning to train a machine learning model to predict customer effort metrics based on words in dialogue data 118. The customer feedback data can be used as labels of training data for such supervised machine learning, while dialogue data 118 from communication sessions that correspond to the customer feedback data can be features of the training data. Accordingly, supervised machine learning can train the machine learning model until one or more keywords 124 are identified in the dialogue data 118 that best correlate with and/or predict corresponding customer feedback data received at block 602. In various examples, such supervised machine learning can be based on support-vector networks, linear regression, logistic regression, decision trees, neural networks, and/or other machine learning and/or artificial intelligence techniques.

The contact center system 102 can add identified keywords 124 to one or more keyword categories 202. The contact center system 102 can also adjust and refine sets of keywords 124 in one or more of the keyword categories 202 over time based on customer feedback data received at block 602. For example, when a training opportunity category 204 has previously been defined with a set of keywords 124, new customer feedback data may be received at block 602 that identifies new communication sessions that have been perceived to be associated with high customer effort. Accordingly, if the contact center system 102 identifies additional words from such new communication sessions as being associated with perceptions of high customer effort at block 606, the additional words can be added as new keywords 124 in the training opportunity category 204.

Additionally, if newly identified keywords 124 do not fit within existing keyword categories 202, the contact center system 102 can define new keyword categories 202. For example, if only a training opportunity category 204 had been defined, customer feedback data received at block 602 may identify a set of communication sessions where customers 104 rated representatives 106 a lowest possible rating. However, a review of dialogue data 118 from those communication sessions may reveal that customers were not unhappy with language used by the representatives 106 during the communication session, but were instead unhappy due to an on-going issue that had not been previously resolved. Accordingly, in this example, keywords 124 identified in the dialogue data 118 can used to define a new on-going issue category 206.

In some examples, the contact center system 102 can perform one or more of the blocks of FIG. 6 in response to user input provided by a user of the contact center system 102, such as a contact center manager or other user. For example, when the contact center system 102 receives customer feedback data at block 602 that indicates that one or more specific communication sessions were perceived to have been associated with high customer effort, a user can use the contact center system 102 to listen to audio recordings or read text transcripts of those specific communication sessions. The user can then provide user input to the contact center system 102 that identifies or flags certain words used by representatives 106 that may have led to the perceptions of high customer effort. The contact center system 102 can accordingly use such user input to identify those words as keywords 124 at block 606.

After keywords has been identified using the process of FIG. 6, the contact center system 102 can review dialogue data 118 for subsequent communication sessions with representatives 106 to automatically determine if any of the keywords 124 are used during the communication sessions. As discussed above, keywords 124 may be in different keyword categories 202.

As an example, if the contact center system 102 finds that dialogue data 118 for a new communication session contains keywords 124 in the training opportunity category 204, the contact center system 102 can flag or highlight a corresponding communication record 304 as a negative outlier based on a KPI graph 302 associated with a keyword frequency KPI 126. The contact center system 102 may also, or alternately, determine and/or display trends associated with the keyword frequency KPI 126 based on the analysis of the new communication session, and/or display an indication that the new communication record 304 matches the training opportunity category 204 as shown in the example of FIG. 5.

As another example, if the contact center system 102 finds that dialogue data 118 for a new communication session contains keywords 124 in the proactive retention category 210, the contact center system 102 can flag that communication session for a user. For instance, in some examples the communication session can be flagged for a retention manager who can contact the customer 104 at a later point in time to attempt to proactively dissuade the customer 104 from ceasing use of the company's products or services. In other examples, the contact center system 102 can display a pop-up message or other user interface element on a terminal 110 of a representative 106 when keywords 124 in a proactive retention category 210 are detected based on a substantially real-time analysis of dialogue data 118, such that the representative 106 can take action to proactively dissuade the customer 104 from ceasing use of the company's products or services.

Figure 7:
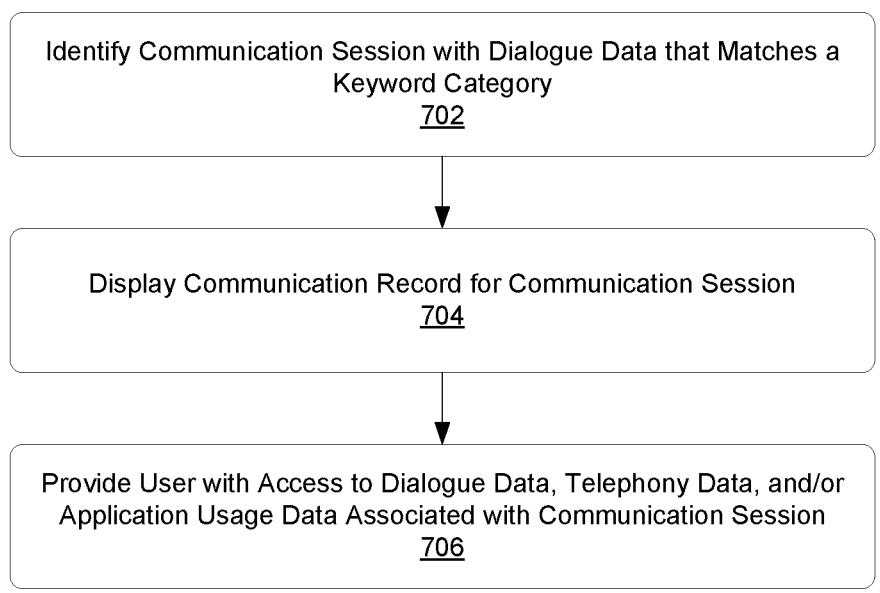
FIG. 7 shows a flowchart illustrating a method for identifying and flagging communication sessions that have dialogue data that matches a keyword category.

FIG. 7 shows a flowchart illustrating a method for identifying and flagging communication sessions that have dialogue data 118 that matches a keyword category 202.

At block 702, the contact center system 102 can identify communication sessions that have dialogue data 118 that match keywords 124 of a keyword category 202. For example, a contact center system 102 can compare words identified in audio recordings or text transcripts of communication sessions against keywords 124 of the keyword category 202 to look for matches, and/or look for matches in dialogue data 118 that meet rules associated with the keyword category 202.

At block 704, the contact center system 102 can display, in a user interface, communication records 304 that correspond to the communication sessions identified at block 702. In some examples, the contact center system 102 can display the communication records 304 on a dashboard 128 as shown in the example of FIG. 5. The contact center system 102 can also use the dashboard 128 to flag or highlight the communication records 304 based on data in a KPI graph 302 that arranges the communication records 304 by values of a KPI 126 indicating a frequency of usage of keywords 124 in the keyword category 202. For example, individual communication records 304 that are negative outliers 310 and/or positive outliers 314 on a KPI graph 302 due to relatively high or low usage levels of keywords 124 in the keyword category 202 can be flagged or identified in a dashboard 128 or other user interface at block 704.

At block 706, the contact center system 102 can allow users to access dialogue data 118, telephony data 120, and/or application usage data 122 associated with the communication records 304 displayed at block 704. For example, a user can select a communication record 304 that is displayed, highlighted, or flagged in the dashboard 128, for example as shown in FIG. 5, to drill down into details about a corresponding communication session, including being presented with options in the dashboard 128 to listen to and/or view dialogue data 118 from the communication session, access telephony data 120 about the communication session, and/or access application usage data 122 associated with the communication session.

The contact center system 102 can use the process of FIG. 7 to evaluate dialogue data 118 from communication sessions against keywords 124 of a set of keyword categories 202. For example, the contact center system 102 can perform block 702 multiple times in parallel, or in sequence, for different keyword categories 202, and then at block 704 display matching communication records 304 for a specific keyword category 202 that a user has selected, or change the communication records 304 displayed at block 704 when the user selects different keyword categories 202.

In some examples, the contact center system 102 can use the process of FIG. 7 to evaluate dialogue data 118 from all, or substantially all, of the communication sessions handled by a contact center. The contact center system 102 can, for example, find communication sessions that have dialogue data 118 matching one or more keyword categories 202 substantially in real-time as communication sessions are occurring, or within a period of hours or any other threshold period of time following completion of individual communication sessions. Accordingly, the contact center system 102 can identify or flag communication records 304 with dialogue data 118 matching a keyword category 202 more quickly than it would take human reviewers to manually listen to and evaluate each communication session, thus allowing communication center managers or other users to further evaluate communication records 304 that the contact center system 102 has already flagged rather than evaluating a random sample or some other sample of communication records 304.

In some examples, the contact center system 102 can also alert representatives 106, for example via a terminal, when the contact center system 102 finds that words or phrases used during a communication session match a keyword category 202. For instance, when the contact center system 102 evaluates dialogue data 118 substantially in real-time, the contact center system 102 may cause a terminal 110 to display a pop-up message when keywords 124 in a proactive retention category 210. The pop-up message may indicate to the representative 106 that the customer 104 may be likely to cancel usage of the company's products or services, provide information about proactive steps the representative 106 can take to avoid cancelation by the customer, prompt a transfer to a retention specialist, and/or other provide other relevant data to the representative 106 to better handle the customer's issue during the current communication session. As another example, if the contact center system 102 evaluates dialogue data 118 after a communication session ends, such as within two to four hours after the communication session ends, and the contact center system 102 determines that keywords 124 in the proactive retention category 210 were used in the communication session, the contact center system 102 can send a notification to a retention specialist or other user such that the customer 104 can be contacted to proactively avoid cancelation by the customer 104.

Figure 8:
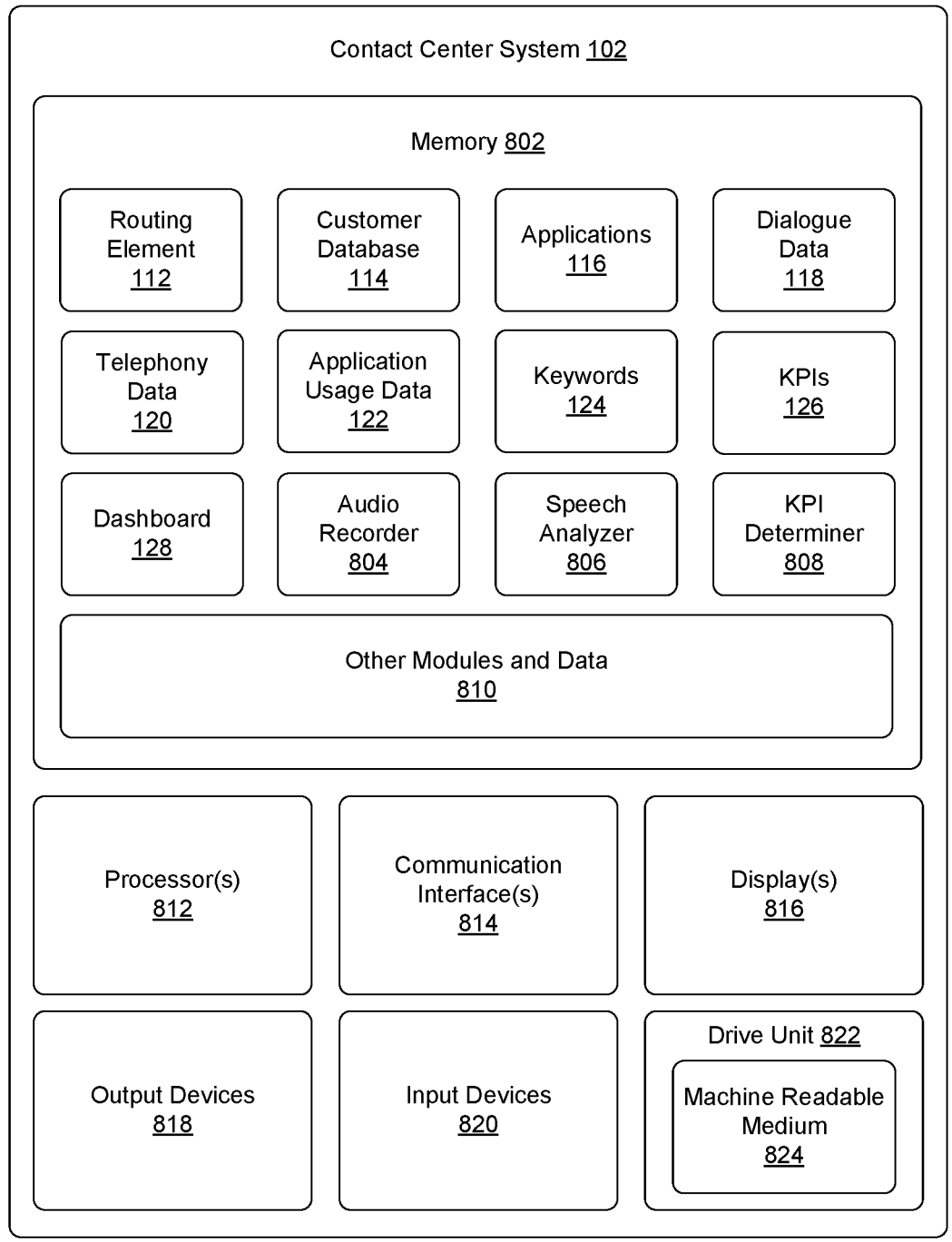
FIG. 8 shows an example system architecture for a contact center system.

FIG. 8 shows an example system architecture for a contact center system 102 in accordance with various examples. The contact center system 102 can include one or more computing devices, such as servers, computers, or other computing elements. In some examples, elements of the contact center system 102 shown in FIG. 8 can be distributed among multiple computing devices. For example, a first computing device can route calls within a contact center, while one or more other computing devices analyze audio recordings of such calls, generates KPIs 126, and/or causes the dashboard 128 to be displayed to users.

The one or more computing devices of the contact center system 102 can include memory 802. In various examples, the memory 802 can include system memory, which may be volatile (such as RAM), non-volatile (such as ROM, flash memory, etc.) or some combination of the two. The memory 802 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by computing devices of the contact center system 102. Any such non-transitory computer-readable media may be part of the computing devices.

The memory 802 can store a routing element 112, a customer database 114, applications 116, dialogue data 118, telephony data 120, application usage data 122, keywords

124, KPIs 126, and/or data for a dashboard 128, as discussed above. The can also store an audio recorder 804, a speech analyzer 806, a KPI determiner 808, and/or other modules and data 810.

The audio recorder 804 can record audio of audible communication sessions between customers 104 and representatives 106. Audio recordings generated by the audio recorder 804 can accordingly be stored as dialogue data 118.

The speech analyzer 806 can be configured to determine words and/or phrases used by customers 104 and representatives 106 during communication sessions. In some examples, the speech analyzer 806 can generate a text transcript of a communication session based on an audio recording of the communication session, and/or be configured to generate a text transcript of a communication session substantially in real-time as a communication session is occurring, and store the text transcript as dialogue data 118. In some examples, the speech analyzer 806 can also, or alternately, be configured to recognize words used in dialogue data 118 and compare keywords 124 against the words recognized in the dialogue data 118.

The KPI determiner 808 can use dialogue data 118, telephony data 120, application usage data 122, and/or other data to generate one or more types of KPIs 126 associated with communication sessions. For example, the KPI determiner 808 can use telephony data 120 to determine hold times and total call durations of communication sessions, use those values to calculate percentages of time that callers were on hold during communication sessions, and store the calculated hold time percentages as KPIs 126 associated with the communication sessions. As another example, the KPI determiner 808 can, alone or in conjunction with the speech analyzer 806, determine a frequency of keywords 124 in one or more keyword categories 202 that are used in dialogue data 118 of communication sessions, and store the keyword frequencies as KPIs 126. For example, the KPI determiner 808 may find that a first communication session has a relatively low frequency of keywords 124 within a training opportunity category 204, but that a second communication session has a relatively high frequency of keywords 124 within that training opportunity category 204. The KPI determiner 808 can store such keyword frequencies as KPIs 126 associated with the training opportunity category 204, such that the first communication session may be identified as a positive outlier 314 for the training opportunity category 204 and the second communication session may be identified as a negative outlier 310 for the training opportunity category 204.

The other modules and data 810 can be utilized by the contact center system 102 to perform or enable performing any action taken by the contact center system 102. The other modules and data 810 can include a platform, operating system, and applications, and data utilized by the platform, operating system, and applications.

The one or more computing devices of the contact center system 102 can also have processor(s) 812, communication interfaces 814, displays 816, output devices 818, input devices 820, and/or a drive unit 822 including a machine readable medium 824.

In various examples, the processor(s) 812 can be a central processing unit (CPU), a graphics processing unit (GPU), both a CPU and a GPU, or any other type of processing unit. Each of the one or more processor(s) 812 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 812 may also be responsible for executing computer applications stored in the memory 802, which can be associated with common types of volatile (RAM) and/or nonvolatile (ROM) memory.

The communication interfaces 814 can include transceivers, modems, interfaces, antennas, telephone connections, and/or other components that can transmit and/or receive data over networks, telephone lines, or other connections.

The display 816 can be a liquid crystal display or any other type of display commonly used in computing devices. For example, a display 816 may be a touch-sensitive display screen, and can then also act as an input device or keypad, such as for providing a soft-key keyboard, navigation buttons, or any other type of input.

The output devices 818 can include any sort of output devices known in the art, such as a display 816, speakers, a vibrating mechanism, and/or a tactile feedback mechanism. Output devices 818 can also include ports for one or more peripheral devices, such as headphones, peripheral speakers, and/or a peripheral display.

The input devices 820 can include any sort of input devices known in the art. For example, input devices 820 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although computing devices of the contact center system 102 can have their own displays 816, output devices 818, and/or input devices 820, in some examples displays 816, output devices 818, and/or input devices 820 can also, or alternately, be part of communication devices 108 or terminals 110 that interface with computing devices of the contact center system 102.

The machine readable medium 824 can store one or more sets of instructions, such as software or firmware, that embodies any one or more of the methodologies or functions described herein. The instructions can also reside, completely or at least partially, within the memory 802, processor(s) 812, and/or communication interface(s) 814 during execution thereof by the one or more computing devices of the contact center system 102. The memory 802 and the processor(s) 812 also can constitute machine readable media 824.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   receiving, by one or more processors, feedback data characterizing first interactions with a contact center, wherein:
   the feedback data includes customer-specified effort ratings indicating subjective perceptions of effort expended by customers during the first interactions;
   identifying, by the one or more processors, from among the first interactions, and based on comparisons between the customer-specified effort ratings and a predetermined effort rating threshold, first high effort interactions perceived by respective customers as being associated with relatively high levels of effort that exceed the predetermined effort rating threshold;

identifying, by the one or more processors, and based on first dialogue data associated with the first interactions, one or more keywords that were used more frequently during the first high effort interactions than during other interactions of the first interactions;

identifying, by the one or more processors, and from among second interactions with the contact center, second high effort interactions by:
  determining that second dialogue data, associated with the second high effort interactions, includes instances of the one or more keywords; and
  presenting, by the one or more processors, a user interface that flags the second high effort interactions for review, wherein:
    the user interface presents one or more user-selectable options to access additional information associated with the second high effort interactions.

2. The method of claim 1, further comprising storing, by the one or more processors, the one or more keywords in association with a keyword category that corresponds to customer perceptions of high effort.

3. The method of claim 1, wherein the additional information, accessible via the one or more user-selectable options of the user interface, comprises at least one of:
  the second dialogue data associated with the second high effort interactions,
  telephony data associated with one or more representatives that handled the second high effort interactions, or
  usage data indicating software application usage by the one or more representatives in association with the second high effort interactions.

4. The method of claim 1, wherein the second high effort interactions are associated with one or more representatives of the contact center, and indicate opportunities to train the one or more representatives to avoid usage of the one or more keywords.

5. The method of claim 1, wherein the one or more keywords are associated with procedures used in the contact center, and indicate opportunities to change the procedures.

6. The method of claim 1, further comprising:
  generating, by the one or more processors, trend data associated with at least one of the first interactions or the second interactions over time; and
  causing, by the one or more processors, the user interface to present the trend data,
  wherein the trend data indicates at least one of:
    usage of the one or more keywords,
    hold percentages,
    call transfer statistics,
    repeat call statistics, or
    application idle statistics.

7. The method of claim 1, further comprising:
  identifying, by the one or more processors, from among the first interactions, and based on second comparisons between the customer-specified effort ratings and a second predetermined effort rating threshold, first low effort interactions perceived by the respective customers as being associated with second levels of effort that are equal to or less than the second predetermined effort rating threshold;
  identifying, by the one or more processors, and based on the first dialogue data associated with the first interactions, one or more second keywords that were used more frequently during the first low effort interactions than during other interactions of the first interactions; and
  identifying, by the one or more processors, and from among the second interactions with the contact center, second low effort interactions by:
    determining that the second dialogue data, associated with the second low effort interactions, includes instances of the one or more second keywords.

8. The method of claim 7, further comprising causing, by the one or more processors, the user interface to identify the second low effort interactions, wherein:
  the user interface presents the one or more user-selectable options to access the additional information associated with the second low effort interactions.

9. The method of claim 1, wherein at least one of natural language processing or a machine learning model is used to identify the one or more keywords that were used more frequently during the first high effort interactions than during the other interactions.

10. The method of claim 1, further comprising capturing, by the one or more processors, and substantially in real time during the second interactions with the contact center, the second dialogue data.

11. The method of claim 1, wherein:
  the first dialogue data indicates frequencies of words used during the first interactions, and
  the one or more keywords, that were used more frequently during the first high effort interactions than during the other interactions, are identified based on the frequencies of the words.

12. A computing system, comprising:
  one or more processors; and
  memory storing computer-executable instructions that, when executed by the one or more processors, cause the one or more processors to:
    receive feedback data, characterizing first interactions with a contact center, including customer-specified effort ratings indicating subjective perceptions of effort expended by customers during the first interactions;
    identify, from among the first interactions, and by comparing the customer-specified effort ratings with a predetermined effort rating threshold, first high effort interactions perceived by respective customers as being associated with levels of effort that exceed the predetermined effort rating threshold;
    identify, based on first dialogue data associated with the first interactions, one or more keywords that were used more frequently during the first high effort interactions than during other interactions of the first interactions;
    identify, from among second interactions with the contact center, second high effort interactions by:
      determining that second dialogue data, associated with the second high effort interactions, includes instances of the one or more keywords; and
    present a user interface that flags the second high effort interactions for review, wherein:
      the user interface presents one or more user-selectable options to access additional information associated with the second high effort interactions.

13. The computing system of claim 12, wherein the computer-executable instructions further cause the one or more processors to:
  identify, from among the first interactions, and based on second comparisons between the customer-specified effort ratings and a second predetermined effort rating threshold, first low effort interactions perceived by the respective customers as being associated with second levels of effort that are equal to or less than the second predetermined effort rating threshold;

identify, based on the first dialogue data associated with the first interactions, one or more second keywords that were used more frequently during the first low effort interactions than during other interactions of the first interactions; and identify, from among the second interactions with the contact center, second low effort interactions by:
determining that the second dialogue data, associated with the second low effort interactions, includes instances of the one or more second keywords.

14. The computing system of claim 12, wherein the additional information, accessible via the one or more user-selectable options of the user interface, comprises at least one of:
the second dialogue data associated with the second high effort interactions,
telephony data associated with one or more representatives that handled the second high effort interactions, or
usage data indicating software application usage by the one or more representatives in association with the second high effort interactions.

15. One or more non-transitory computer-readable media storing computer-executable instructions that, when executed by one or more processors of a computing system, cause the computing system to:
receive feedback data, characterizing first interactions with a contact center, including customer-specified effort ratings indicating subjective perceptions of effort expended by customers during the first interactions;
identify, from among the first interactions, and by comparing the customer-specified effort ratings with at least one predetermined effort rating threshold associated with a particular effort level, a first subset of interactions perceived by respective customers as being associated with the particular effort level;
identify, based on first dialogue data associated with the first interactions, one or more keywords that were used more frequently during the first subset of interactions than during other interactions of the first interactions;
identify, from among second interactions with the contact center, a second subset of interactions associated with the particular effort level by:
determining that second dialogue data, associated with the second subset of interactions, includes instances of the one or more keywords; and
present a user interface that identifies the second subset of interactions and presents one or more user-selectable options to access additional information associated with the second subset of interactions.

16. The one or more non-transitory computer-readable media of claim 15, wherein the computer-executable instructions further cause the one or more processors to store the one or more keywords in association with a keyword category that corresponds to the particular effort level.

17. The one or more non-transitory computer-readable media of claim 15, wherein the particular effort level is a high effort level.

18. The one or more non-transitory computer-readable media of claim 15, wherein the particular effort level is a low effort level.

19. The one or more non-transitory computer-readable media of claim 15, wherein the additional information, accessible via the one or more user-selectable options of the user interface, comprises at least one of:
the second dialogue data associated with the second subset of interactions,
telephony data associated with one or more representatives that handled the second subset of interactions, or
usage data indicating software application usage by the one or more representatives in association with the second subset of interactions.

20. A system comprising:
means for receiving feedback data, characterizing first interactions with a contact center, including customer-specified effort ratings indicating subjective perceptions of effort expended by customers during the first interactions;
means for identifying, from among the first interactions, and based on comparisons between the customer-specified effort ratings and a predetermined effort rating threshold, first high effort interactions perceived by respective customers as being associated with levels of effort that exceed the predetermined effort rating threshold;
means for identifying, based on first dialogue data associated with the first interactions, one or more keywords that were used more frequently during the first high effort interactions than during other interactions of the first interactions;
means for identifying, from among second interactions with the contact center, second high effort interactions by:
determining that second dialogue data, associated with the second high effort interactions, includes instances of the one or more keywords; and
means for displaying a user interface that flags the second high effort interactions for review, wherein:
the user interface presents one or more user-selectable options to access additional information associated with the second high effort interactions.

* * * * *